United States Patent
Iizuka et al.

(10) Patent No.: US 8,621,882 B2
(45) Date of Patent: Jan. 7, 2014

(54) COMPRESSOR AND REFRIGERATING MACHINE

(75) Inventors: Koichiro Iizuka, Takasago (JP); Satoshi Ide, Takasago (JP); Toshikatsu Kanemura, Takasago (JP); Yoshihiro Nakayama, Takasago (JP); Masatake Toshima, Kobe (JP); Kazuto Okada, Kobe (JP); Kunihiko Suto, Chiyoda-ku (JP); Kazutaka Kurashige, Chiyoda-ku (JP); Ichirou Sakuraba, Nagoya (JP); Daisuke Hayashi, Nagoya (JP); Masaki Ikeuchi, Amagasaki (JP); Shinji Shato, Amagasaki (JP); Lars Bay Moller, Taastrup (DK); Finn Jensen, Taastrup (DK); Ziad Al-Janabi, Taastrup (DK); Svend Rasmussen, Taastrup (DK); Hans Madsboll, Taastrup (DK); Christian Svarregaard-Jensen, Hojbjerg (DK)

(73) Assignees: Danish Technological Institute, Taastrup (DK); Johnson Controls Denmark APS, Hojbjerg (DK)

( * ) Notice: Subject to any disclaimer, the term of this patent is extended or adjusted under 35 U.S.C. 154(b) by 343 days.

(21) Appl. No.: 12/737,529
(22) PCT Filed: Jul. 23, 2009
(86) PCT No.: PCT/JP2009/063193
§ 371 (c)(1), (2), (4) Date: Mar. 30, 2011
(87) PCT Pub. No.: WO2010/010925
PCT Pub. Date: Jan. 28, 2010

(65) Prior Publication Data
US 2011/0174009 A1 Jul. 21, 2011

(30) Foreign Application Priority Data
Jul. 25, 2008 (JP) .................................. 2008-192776

(51) Int. Cl.
F28D 5/00 (2006.01)

(52) U.S. Cl.
USPC .............................................. 62/305; 62/468

(58) Field of Classification Search
USPC ...................... 62/193, 305, 468, 505; 417/321
See application file for complete search history.

(56) References Cited

U.S. PATENT DOCUMENTS 2,768,511 A * 10/1956 Moody ........................... 62/505
(Continued)

FOREIGN PATENT DOCUMENTS

JP 62-160056 7/1987
JP 8-317602 11/1996
(Continued)

OTHER PUBLICATIONS

Office Action from the Chinese Patent Office in the counterpart Chinese Patent Application 2009-80129132.1, issued Dec. 17, 2012.
(Continued)

Primary Examiner — Melvin Jones
(74) Attorney, Agent, or Firm — Stites & Harbison PLLC; Juan Carlos A. Marquez, Esq.

(57) ABSTRACT

A compressor and a refrigerating machine which enable an easy disposal of a lubricant, are friendly to the natural environment, and have simple configurations, are provided.

The compressor which is used in a refrigerating machine including an evaporator and a condenser and adapted for compressing refrigerant gas evaporated in the evaporator to convey the compressed refrigerant gas to the condenser, includes: a motor; a housing having a compression chamber inside; a rotary member which has a rotating shaft and is rotated by a driving force of the motor so as to compress water vapor serving as the refrigerant gas in the compression chamber; a bearing for supporting the rotating shaft of the rotary member in the housing; and a lubricant supplier for supplying water serving as a lubricant to the bearing.

10 Claims, 6 Drawing Sheets

(56) References Cited

U.S. PATENT DOCUMENTS

| | | | |
|---|---|---|---|
| 5,881,564 A * | 3/1999 | Kishimoto et al. | 62/193 |
| 6,176,092 B1 | 1/2001 | Butterworth et al. | |
| 6,279,340 B1 | 8/2001 | Butterworth et al. | |
| 6,397,621 B1 | 6/2002 | Reynaud et al. | |

FOREIGN PATENT DOCUMENTS

| | | |
|---|---|---|
| JP | 9-268988 | 10/1997 |
| JP | 2001-165514 | 6/2001 |
| JP | 2002-527711 | 8/2002 |

OTHER PUBLICATIONS

Chinese Office Action from corresponding Chinese Patent No. 200980129132.1 issued May 6, 2013.

International Search Report for Application PCT/JP2009/063193 mailed Oct. 13, 2009.

Office Action from the Japanese Patent Office for the corresponding Japanese Patent Application No. 2008-192776 dated Feb. 5, 2013.

* cited by examiner

COMPRESSOR AND REFRIGERATING MACHINE

TECHNICAL FIELD

The present invention relates to a compressor and a refrigerating machine.

BACKGROUND ART

Conventionally, there has been known a compressor which is used in a refrigerating machine and adapted for compressing refrigerant gas evaporated in an evaporator to convey the compressed refrigerant gas to a condenser (see, for example, Patent Document 1).

Figure 6:
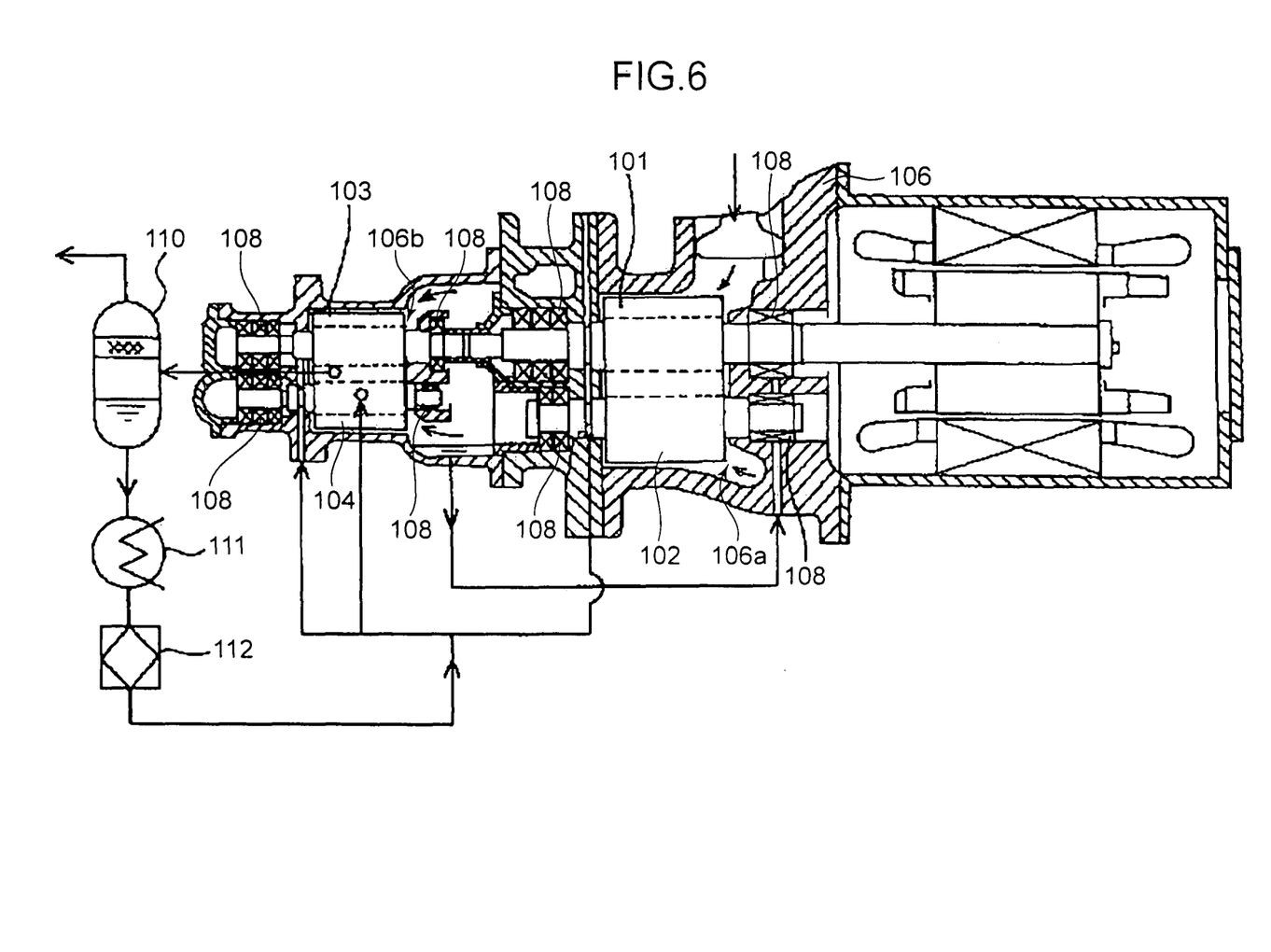
FIG. 6 schematically shows a configuration of a compressor according to a prior art.

FIG. 6 shows a configuration of the compressor disclosed in Patent Document 1. The compressor disclosed in Patent Document 1 is a two-step-type screw compressor operable to compress the refrigerant gas including a chlorofluorocarbon or the like, in two steps. The compressor includes a pair of a first step screw rotors 101, 102, and a pair of second step screw rotors 103, 104. The respective screw rotors 101 to 104 are accommodated in a casing 106.

The first screw rotors 101 and 102 are so arranged as to engage with each other in a first compression chamber 106a in the casing 106. The second screw rotors 103 and 104 are so arranged as to engage with each other in a second compression chamber 106b in the casing 106. A rotor shaft of the each screw rotors 101 to 104 is supported by a corresponding bearing 108.

In the first compression chamber 106a, the first step screw rotors 101, 102 rotate with engaging with each other, and thereby perform a first compression of the refrigerant gas. The compressed refrigerant gas is introduced in the second compression chamber 106b. In the compression chamber 106b, the second screw rotors 103 and 104 rotate with engaging with each other, and thereby perform a second compression of the refrigerant gas. The refrigerant gas to which the second compression is applied is discharged from the compressor.

A lubricating oil is supplied to the respective bearings 108. A part of the supplied lubricating oil is included in the refrigerant gas and flows in the compressor, and is discharged from the compressor together with the refrigerant gas. The refrigerant gas and the lubricating oil discharged together are conveyed to an oil separator 110. The oil separator 110 separates the refrigerant gas from the lubricating oil. The separated refrigerant gas is conveyed to the condenser, while the separated lubricating oil is cooled by an oil cooler 111. The lubricating oil is then processed in an oil filter 112 which removes impurities in the separated lubricating oil, followed by being returned to the compressor to be again supplied to the respective bearings 108.

The above compressor requires the oil separator 110 for separating the refrigerant gas from the lubricating oil discharged from the compressor together with the refrigerant gas. Therefore, there is a problem that the configuration of the compressor becomes complex. In addition, in the above compressor, chlorofluorocarbon is used as the refrigerant gas. This raises a concern that a harmful effect, such as a global warming, is given to the natural environment on its disposal. Further, in the above compressor, the respective bearings 108 are lubricated with the lubricating oil. This results in a problem that a troublesome waste oil treatment is required upon the disposal of the waste oil.

Patent Document 1: Japanese Patent Application Publication No. 9-268988

SUMMARY OF THE INVENTION

An object of the present invention is to provide a compressor and a refrigerating machine which enable an easy disposal of a lubricant, are friendly to the natural environment, and have simple configurations.

The compressor according to one aspect of the present inventions is used in a refrigerating machine including an evaporator and a condenser and adapted for compressing refrigerant gas evaporated in the evaporator to convey the compressed refrigerant gas to the condenser, includes: a motor; a housing having a compression chamber inside; a rotary member which has a rotating shaft and is rotated by a driving force of the motor so as to compress water vapor serving as the refrigerant gas in the compression chamber; a bearing for supporting the rotating shaft of the rotary member in the housing; and a lubricant supplier for supplying water serving as a lubricant to the bearing.

MODE FOR CARRYING OUT THE INVENTION

Embodiments of the present invention will be described below referring to the drawings.

First Embodiment

First, a whole configuration of the refrigerating machine 1 according to the first embodiment of the present invention is described with reference to FIG. 1.

The refrigerating machine 1 of the first embodiment is used, for example, in a cooling device, such as an air conditioner. Here, water is used as a refrigerant in the refrigerating machine 1.

Specifically, the refrigerant machine 1 according to the first embodiment includes an evaporator 2, a compressor 4, a condenser 6, a refrigerant introducing line 8, a refrigerant deriving line 9, a refrigerant supplying line 10, a coolant supplying line 12, a coolant returning line 14, a cooling tower 16, and a coolant pump 18. The refrigerant is circulated in a refrigerant cycle comprised of the evaporator 2, the compressor 4, the condenser 6, the refrigerant introducing line 8, the refrigerant deriving line 9, and the refrigerant supplying line 10. Meanwhile, coolant water is circulated in a coolant cycle comprised of the condenser 6, the coolant supplying line 12, the coolant returning line 14, the cooling tower 16, and the coolant pump 18.

The evaporator 2 is adapted to evaporate water serving as the refrigerant (hereinafter, "water refrigerant").

The compressor 4 is arranged between the evaporator 2 and the condenser 6. Specifically, the compressor 4 is connected to the evaporator 2 through the refrigerant introducing line 8, while being connected to the condenser 6 through the refrigerant deriving line 9. The compressor 4 is adapted to compress water vapor serving as the refrigerant gas, which is evaporated in the evaporator 2 and conveyed from the evaporator 2 through the refrigerant introducing line 8, to convey the compressed water vapor to the condenser 6 through the refrigerant deriving line 9.

The condenser 6 is adapted to cool the water vapor as the refrigerant gas conveyed from the compressor 4 with coolant water so as to condense the water vapor. The condenser 6 has a coolant introducing opening 6a and a coolant discharge opening 6b. The condenser 6 performs a direct heat exchange. Specifically, the condenser 6 makes the water vapor as the refrigerant gas introduced in the condenser 6 contact to the coolant water so as to cool the water vapor, thereby causing the cooled water vapor to be condensed. The condensed water made by this condensation is discharged from the condenser 6 along with coolant water. Accordingly, the coolant water flowing in the coolant cycle contacts with the refrigerant flowing in the refrigerant cycle, in the first embodiment.

The condenser 6 and the evaporator 2 are connected to each other by the refrigerant supplying line 10. An internal pressure of the compressor 6 is higher than an internal pressure of the evaporator 2. The difference between the pressure in the condenser 6 and the pressure in the evaporator 2 causes a part of water discharged from the condenser 6 to be conveyed to the evaporator 2 through the refrigerant supplying line 10 as the water refrigerant.

The coolant supplying line 12 is used for supplying the coolant water to the condenser 6. The coolant returning line 14 is used for returning a part of the water discharged from the condenser 6 to the coolant supplying line 12. One end of the coolant supplying line 12 connects to the coolant introducing opening 6a of the condenser 6, and one end of the coolant returning line 14 connects to the coolant discharge opening 6b of the condenser 6. Another end of the coolant returning line 14 connects to another end of the coolant supplying line 12 through the cooing tower 16. This arrangement allows coolant water to be supplied from the cooling tower 16 through the coolant supplying line 12 to the condenser 6. Subsequently, the coolant water discharged from the condenser 6 is returned to the cooling tower 16 through the coolant returning line 14. The coolant cycle for circulating the coolant water is thus comprised.

The cooling tower 16 is an open-type cooling tower. Specifically, the cooling tower 16 is provided with an opening and a fan 16a in an upper portion thereof. The opening is used for taking external air into the cooling tower 16. The fan 16a is used for conveying external air to an inside of the cooling tower 16 through the opening. The cooling tower 16 is adapted to cool, inside thereof, coolant water conveyed through the coolant returning line 14 by showering coolant water from the upper portion of the cooling tower and blowing coolant water with the fan 16a.

The coolant pump 18 is disposed in the coolant returning line 14. The coolant pump 18 is adapted to put pressure on coolant water discharged to the coolant returning line 14 from the condenser 6 to convey the coolant water to the cooling tower 16 and to the coolant supplying line 12 arranged ahead the cooling tower 16.

Figure 1:
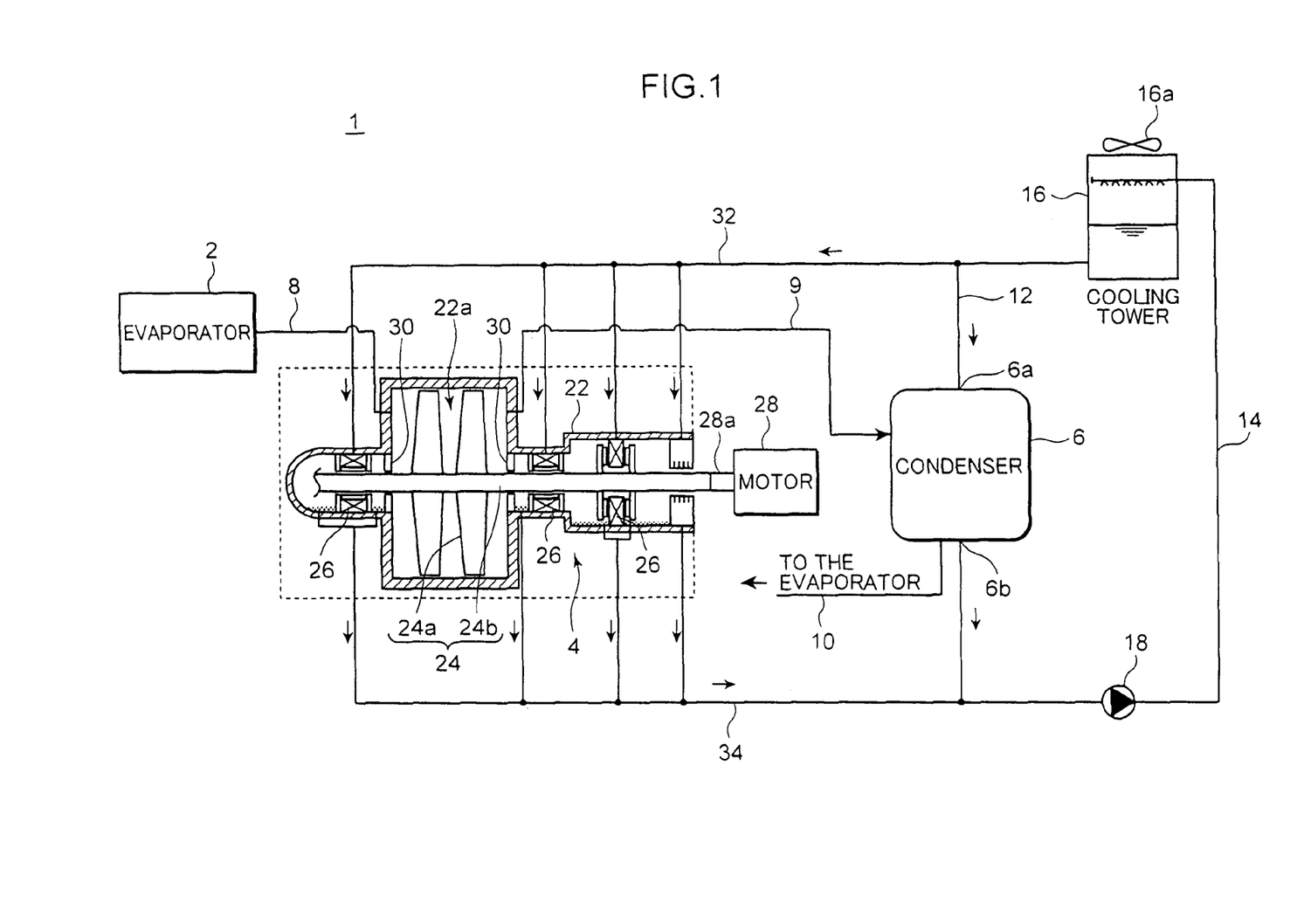
FIG. 1 schematically shows a compressor and a refrigerating machine according to the first embodiment of the present invention.
Figure 2:
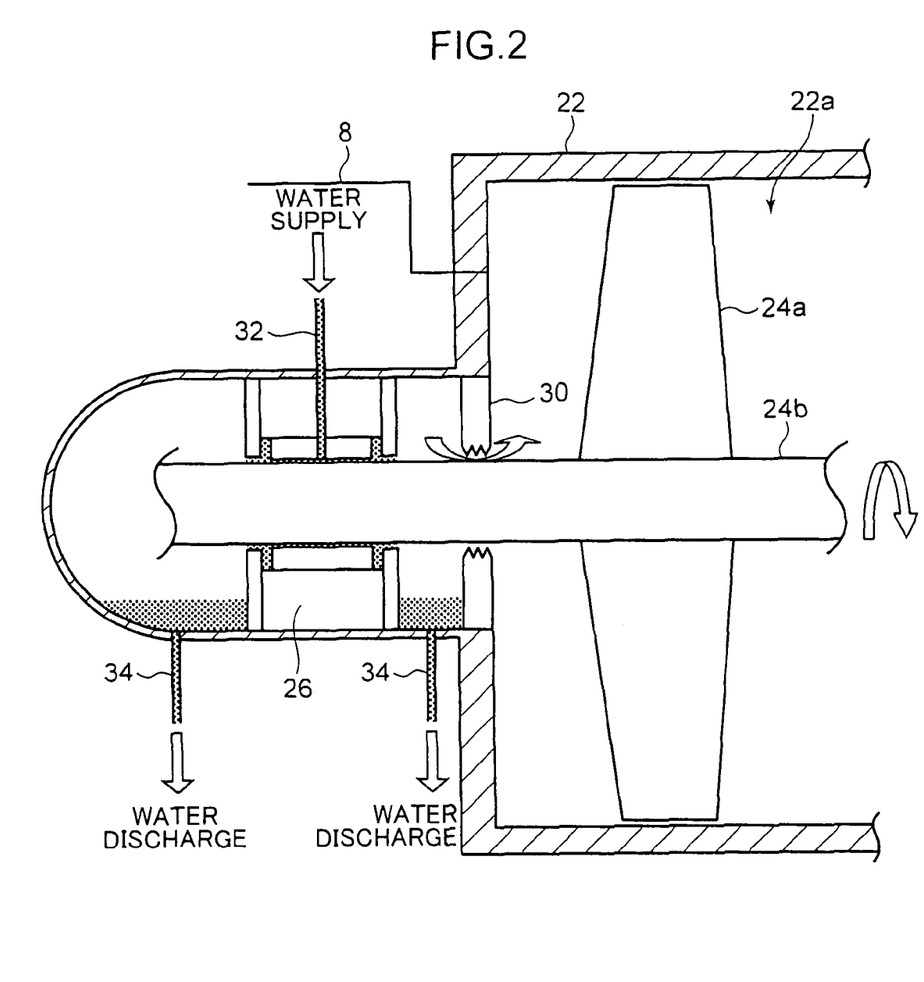
FIG. 2 schematically shows a partially enlarged configuration in the vicinity of a bearing and a sealing member for separating a space where the bearing is arranged from a compression chamber in the compressor shown in FIG. 1.

Next, a detailed configuration of the compressor 4 according to the first embodiment is described, referring to FIGS. 1 and 2.

As mentioned above, the compressor 4 according to the first embodiment is adapted to compress, in a compression chamber 22a in a housing 22 thereof, the water vapor serving as the refrigerant gas evaporated in the evaporator 2 to convey the compressed water vapor to the condenser 6. In the compressor 4, water is supplied as the lubricant to bearings 26 arranged in the housing 22.

Specifically, the compressor 4 includes the housing 22, a rotary member 24, a plurality of bearings 26, a motor 28, sealing members 30, a lubricant supplying line 32, and a lubricant discharging line 34.

The housing 22 is so formed as to be hollow, and include inside thereof the rotary member 24, the plurality of bearings 26, and the sealing member 30. The housing 22 includes inside thereof the compression chamber 22a for compressing refrigerant gas. The refrigerant introducing line 8 and the refrigerant deriving line 9 connect to the compression chamber 22a. The refrigerant introducing line 8 introduces the water vapor serving as the refrigerant gas from the evaporator 2 into the compression chamber 22a. The refrigerant deriving line 9 allows the compressed refrigerant gas to flow from the compression chamber 22a to the condenser 6. A pressure at an inlet portion of the compression chamber 22a is set at, for example, a saturated vapor pressure of water at about 7 degrees C. so as to prevent the water vapor serving as the refrigerant gas introduced into the compression chamber 22a from being condensed.

The rotary member 24 is rotated by a driving force of the motor 28 so as to compress the water vapor as the refrigerant gas in the compression chamber 22a. The rotary member 24 has a plurality of impellers 24a and a rotating shaft 24b.

The plural impellers 24a are arranged inside the compression chamber 22a and mounted to the rotating shaft 24b. The refrigerating gas, that is the water vapor, in the compression chamber 22a is compressed by being rotated the impellers 24a together with the rotating shaft 24b.

The rotating shaft 24b is arranged so as to extend in an axial direction of the housing 22 in the housing 22. The rotating shaft 25b has one end portion connected to a driving shaft 28a of the motor 28. The rotating shaft 24b is rotatably supported by the plurality of bearings 26. The rotating shaft 24b is rotated by the driving force of the motor 28 transmitted through the driving shaft 28a, and the entire rotary member 24 is rotated accordingly.

The plurality of bearings 26 are so arranged to have spaces therebetween along the rotating shaft 24b of the rotary member 24 in the housing 22. One bearing 26 of the plurality of bearings 26 is arranged at a position in the vicinity of the compression chamber 22a between the compression chamber 22a and the motor 28. This bearing 26 supports the rotating shaft 24b with respect to an inner surface of the housing 22 at the position. Another bearing 26 is arranged in a position opposite to the motor 28 relative to the compression chamber 22a. This bearing 26 supports the rotating shaft 24b with respect to the inner surface of the housing 22 at the position. Each of the bearings 26 is a sliding bearing. To each of the bearings 26, water serving as a lubricant (hereinafter, "lubricant water") is supplied through the lubricant supplying line 32. As shown in FIG. 2, a slight clearance is formed between an inner surface of the bearing 26 and an outer surface of the rotating shaft 24b. The lubricant water supplied to the bearing 26 is drawn into the clearance to form a water film, followed by flowing out toward both sides of the each bearing 26 in the axial direction thereof from the clearance. The flown lubricant water remains around the bearing 26 in the housing 22 and is discharged through the lubricant discharging line 34. Further, pressures in spaces where the bearings 26 are arranged in the housing 22 are set to about equal to or more than 1 atm.

The sealing member 30 is fixed to the inner surface of the housing 22 at a position between the compression chamber 22a and the bearing 26 adjacent to the compression chamber 22a. The sealing member 30 separates the compression chamber 22a from the space in the housing 22 where the bearing 26 is arranged. The sealing member 30 is a non-contact type sealing having a ring-shape, and surrounds the rotating shaft 24b with a space relative to the rotating shaft 24b. A pressure in the compression chamber 22a is lower than a pressure in the space where the bearing 26 is arranged. This causes a part of the lubricant water in the space where the bearing 26 is arranged to be drawn into the compression chamber 22a through the clearance between the sealing member 30 and the rotating shaft 24b. At this time, the sealing member 30 suppresses an immediate flow of a large amount of the lubricant water into the compression chamber 22a.

The lubricant supplying line 32 connects the respective bearings 26 with the coolant supplying line 12. The lubricant supplying line 32 is adapted to supply the lubricant water to the respective bearings 26. A part of the coolant water supplied from the cooling tower 16 to the condenser 6 through the coolant supplying line 12 by a discharge pressure of the coolant pump 18 is supplied as the lubricant water to the respective bearings 26 through the lubricant supplying line 32. The lubricant supplying line 32 is embraced in a concept of the lubricant supplier of the present invention.

The lubricant discharging line 34 is adapted to discharge, out of the housing 22, the lubricant water flowing out from the respective bearings 26 and remaining around the bearings 26 in the housing 22. The lubricant discharging line 34 has one end connected to an outlet opening around the respective bearings 26 in the housing 22 and another end connected to the coolant returning line 14. This arrangement allows the lubricant water discharged from the housing 22 to join with the coolant water which is discharged from the condenser 6 and flow through the coolant returning line 14. That is, in the first embodiment, the lubricant water is supplied to the respective bearings 26 of the compressor 4 from a coolant cycle system in which the coolant water is supplied to the condenser 6, whereafter the used lubricant water is returned to the coolant cycle system.

Next, operations of the refrigerating machine 1 and the compressor 4 according to the first embodiment are described.

First, the water refrigerant is evaporated in the evaporator 2. This causes the water vapor serving as the refrigerant gas to be introduced from the evaporator 2 through the refrigerant introducing line 8 to the compression chamber 22a of the compressor 4. The water vapor serving as the refrigerant gas introduced in the compressor chamber 22a is compressed by the impellers 24a of the rotary member 24 rotated by the driving force of the motor 28. The compressed water vapor serving as the refrigerant gas is derived from the compression chamber 22a and conveyed to the condenser 6 through the refrigerant deriving line 9.

To the condenser 6, the coolant water is supplied through the coolant supplying line 12 from the cooling tower 16 by the discharge pressure of the coolant pump 18. In the condenser 6, the water vapor serving as refrigerant gas contacts to the coolant water to be cooled, thereby causing the water vapor to be condensed. The condensed water made by the condensation is discharged along with the coolant water from the condenser 6. A part of the discharged water is conveyed as the water refrigerant through the refrigerant supplying line 10 to the evaporator 2, caused by the internal pressure of the condenser 6 higher than the internal pressure of the evaporator 2. Meanwhile, remaining water is conveyed as the coolant water through the coolant returning line 14 to a side of the coolant supplying line 12 by the coolant pump 18. The coolant water conveyed by the coolant pump 18 is cooled in the cooling tower 16, followed by being again supplied through the coolant supplying line 12 to the condenser 6.

In the compressor 4, the rotating shaft 24b of the rotary member 24 rotated as mentioned above is supported by the plurality of bearings 26. The rotation of the rotating shaft 24b causes to generate a heat in the respective bearings 26, and thereby the temperature of the rotating shaft 24b rises. A part of the coolant water is supplied as the lubricant water to the respective bearings 26 from the cooling tower 16 through the coolant supplying line 12 and the lubricant supplying line 32. The supplied lubricant water is used for lubrication between the respective bearings 26 and the rotating shaft 24b of the rotary member 24 and cooling the bearings 26. The lubricant water supplied to the respective bearings 26 flows from the clearance between the each bearing 26 and the rotating shaft 24b toward both sides of the each bearing 26 in the axial direction thereof, and remains around the respective bearings 26 in the housing 22.

A part of the lubricant water flown out from the respective bearings 26 may be drawn into the compression chamber 22a through the clearance between an inner surface of the non-contact-type sealing member 30 and the outer surface of the rotating shaft 24b, caused by the pressure in the compression chamber 22a which is lower than that in the space where the bearings 26 are arranged. However, a pressure in an area having the lower pressure in the compression chamber 22a is set at the saturated vapor pressure, causing the lubricant water drawn into the compression chamber 22a to be immediately evaporated. Therefore, it is prevented that the impellers 24a of the rotary member 24 are damaged due to a collision of droplets of the lubricant water. The lubricant water evaporated in the compression chamber 22a is discharged from the compression chamber 22a together with the water vapor serving as the refrigerant gas to be compressed in the compression chamber 22a, and is conveyed to the condenser 6. On the other hand, the lubricant water remaining around the bearings 26 in the housing 22 is discharged through the lubricant discharging line 34 and joins the coolant water flowing through the coolant returning line 14.

The refrigerating machine 1 and the compressor 4 according to the first embodiment are thus operated.

As mentioned above, the compressor 4 according to the first embodiment compresses the water vapor as the refrigerant gas evaporated in the evaporator 2 to convey the compressed water vapor to the condenser 6, therefore, in the refrigerant machine 1 to which the compressor 4 is applied, water can be used as the refrigerant. Since water originally exists in the nature, water affects on the natural environment on its disposal much less than a refrigerant including a chemical material, such as chlorofluorocarbon does. Further, the lubricant water is supplied to the respective bearings 26 in the first embodiment. Even if the lubricant water supplied to the respective bearings 26 is mingled with the water vapor serving as the refrigerating gas in the compression chamber 22a of the compressor 4, it is not necessary to separate the lubricant water from the refrigerant gas after discharged from the compressor 4, since the lubricant water and the refrigerating gas are both water. Accordingly, the refrigerating machine is not required to mount therein a separator for separating the refrigerant gas from the lubricant water, unlike a conventional technique in which a refrigerant gas and a lubricating oil discharged together from a compressor are separated from each other by an oil separator. This simplifies the configurations of the compressor 4 and the refrigerating machine 1. Further, in the first embodiment, water is supplied to the respective bearings 26 as the lubricant. Thus, unlike a conventional technique in which bearings are lubricated with lubricating oil, water serving as the lubricant can be thrown away without troublesome treatment upon the disposal thereof. Therefore, according to the first embodiment, it is possible to obtain the compressor 4 and the refrigerating machine 1 which are capable of an easy disposal of the lubricant, are friendly to the nature environment with simple configurations.

Further, according to the first embodiment, the lubricant supplying line 32 connects the respective bearings 26 with the coolant supplying line 12 through which the coolant water is supplied to the condenser 6. This arrangement allows a part of the coolant water to be supplied to the condenser 6 to also be supplied to the respective bearings 26 as the lubricant water. Accordingly, a water-storage equipment is not required, unlike a configuration in which the lubricant water is supplied from a water-storage equipment to a bearing 26. As a consequent, the configurations of the compressor 4 and the refrigerating machine 1 can be prevented from being complicated. In addition, according to the first embodiment, a part of the low-temperature coolant water to be supplied to the condenser 6 is also supplied to the respective bearings 26. Therefore, the bearings 26 can be cooled. In other words, according to the first embodiment, the respective bearings 26 can be cooled by using a part of the low-temperature coolant water, eliminating a necessity of cooling of the lubricant to be supplied to the bearings 26 for cooling the bearings 26 by using a cooling equipment or the like separately provided. With this arrangement, the respective bearings 26 can be cooled without complicating the configurations of the compressor 4 and the refrigerating machine 1.

Further, according to the first embodiment, the condenser 6 performs the direct heat exchange, and the coolant water discharged from the condenser 6 is returned through the coolant returning line 14 to the coolant supplying line 12. Accordingly, a part of the coolant water discharged from the condenser 6 performing direct heat exchange can be supplied from the coolant supplying line 12 through the lubricant supplying line 32 to the respective bearings 26. The coolant water and the condensed water which is obtained by the condensation of the water vapor serving as the refrigerant gas are discharged together from the condenser 6 performing the direct heat exchange, allowing relatively fine water to be discharged. The fine water is supplied to the respective bearings 26 as the lubricant water, and thus, impurities are hardly to be separated out. Therefore, a processing equipment for, for example, performing a removal of mineral and a filter for removing separated impurities are unnecessary. Consequently, the configuration of the refrigerating machine 1 can be prevented from being complicated.

Further, according to the first embodiment, the coolant pump 18 for conveying the coolant water discharged from the condenser 6 toward the coolant supplying line 12 is provided in the coolant returning line 14, allowing a part of the coolant water to be conveyed from the coolant supplying line 12 through the lubricant supplying line 32 to the respective bearings 26 by using the discharge pressure of the coolant pump 18. Accordingly, the lubricant water can be smoothly supplied to the respective bearings 26 without providing otherwise pump for conveying the lubricant water to the bearings 26 in the lubricant supplying line 32. Therefore, the lubricant water can be smoothly supplied to the respective bearings 26 without complicating the configuration of the refrigerant machine 1.

Second Embodiment

Figure 3:
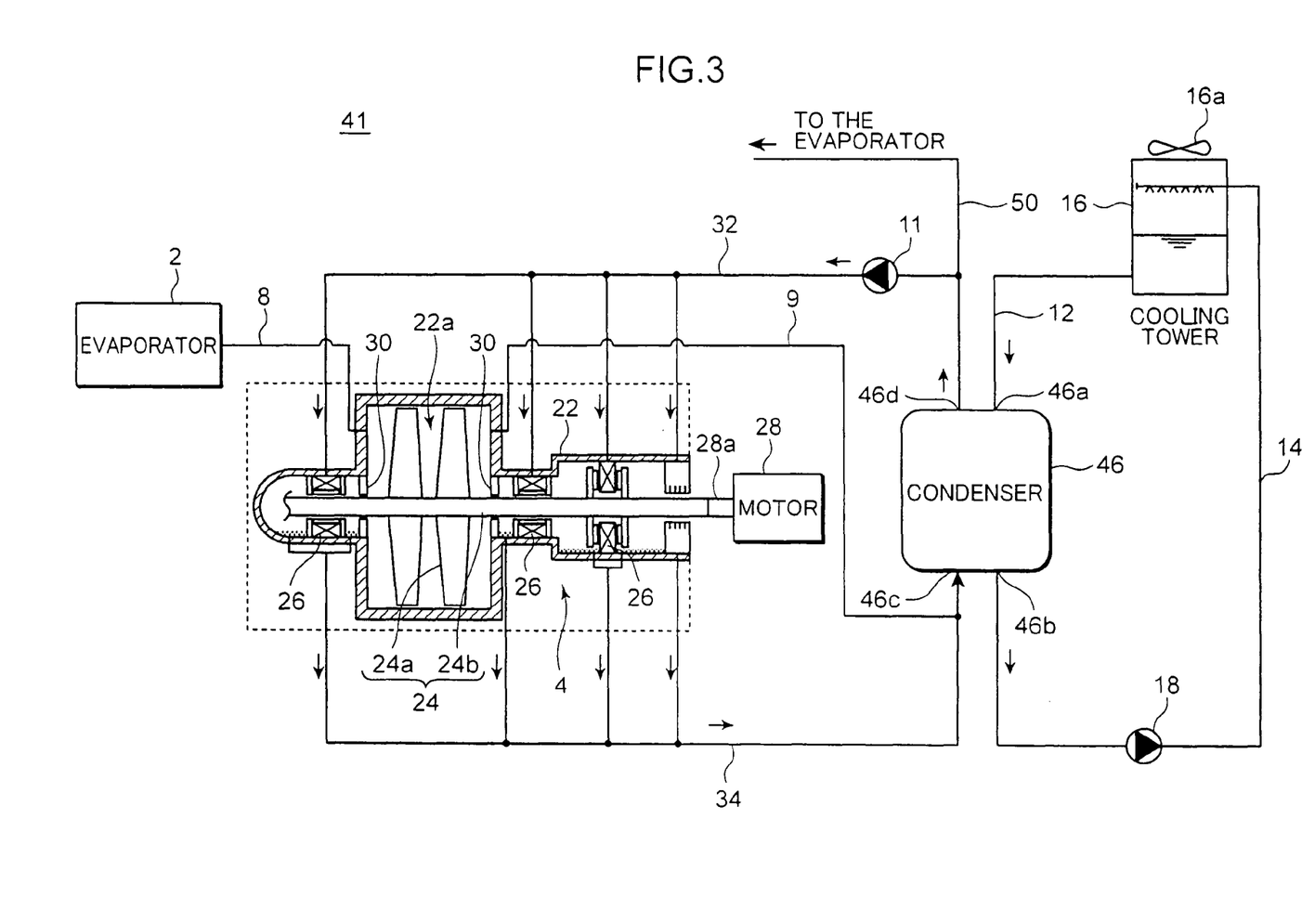
FIG. 3 schematically shows a compressor and a refrigerating machine according to a second embodiment of the present invention.

Next, the respective configurations of the compressor 4 and the refrigerating machine 41 according to the second embodiment are described referring to FIG. 3.

In the second embodiment, a condenser 46 is an indirect heat exchange type condenser, unlike the first embodiment. Thus, in the condenser 46, coolant water flowing through the coolant cycle does not contact to a refrigerant flowing through a refrigerant cycle. Further, the lubricant supplying line 32 connects the respective bearings 26 with a condensed water supplying line 50 through which condensed water is conveyed from the condenser 46 to the evaporator 2.

Specifically, the condenser 46 has a coolant introducing opening 46a and a coolant discharge opening 46b. The coolant introducing opening 46a of the condenser 46 is connected to the coolant supplying line 12, and the coolant discharge opening 46b of the condenser 46 is connected to the coolant returning line 14. Another end of the condensed water supplying line 50 connects to the evaporator 2.

In the condenser 46 performing the indirect heat exchange, the coolant water and the water vapor serving as the refrigerant gas flows in separate cycles, and the water vapor serving as the refrigerant gas is cooled by the coolant water to be condensed. Accordingly, the coolant water and the condensed water never join in the condenser 46. The used coolant water is discharged from the coolant discharge opening 46b to the coolant returning line 14, while the condensed water is discharged from the refrigerant discharge opening 46d to the condensed water supplying line 50. The condensed water discharged to the condensed water supplying line 50 is conveyed to the evaporator 2 by the difference in the internal pressures between the condenser 6 and the evaporator 2.

In the second embodiment, the lubricant supplying line 32 connects the respective bearings 26 of the compressor 4 with the condensed water supplying line 50. A lubricant supplying pump 11 is disposed in the lubricant supplying line 32. The lubricant discharging line 34 connects to the refrigerant deriving line 9.

In the second embodiment, the water vapor which serves as the refrigerant gas and is discharged from the compression chamber 22a of the compressor 4 is supplied through the refrigerant deriving line 9 to the condenser 46. In the condenser 46, the water vapor serving as the refrigerant gas is cooled by the coolant water to be condensed. The condensed water obtained by the condensation is discharged from the condenser 46 to the condensed water supplying line 50, and conveyed as the water refrigerant to the evaporator 2, while a part of the condensed water is supplied from the condensed water supplying line 50 through the lubricant supplying line 32 to the respective bearings 26 of the compressor 4 by the drive of the lubricant supplying pump 11.

A construction and an operation according to the second embodiment except for the above are same as a construction and an operation according to the first embodiment.

As mentioned above, in the second embodiment, the lubricant supplying line 32 connects the respective bearings 26 with the condensed water supplying line 50 for conveying the condensed water from the condenser 46 to the evaporator 2, while the lubricant supplying pump 11 is disposed in the lubricant supplying line 32. This arrangement allows a part of the condensed water conveyed from the condenser 46 to the evaporator 2 to be also used as the lubricant water to be supplied to the respective bearings 26. Accordingly, a water-storage equipment for the lubricant is unnecessary, as in the first embodiment, therefore the configurations of the compressor 4 and the refrigerating machine 41 are prevented from being complicated. Further, a purity degree of the condensed water is high, therefore, impurities are hardly separated out even if the condensed water is used as the lubricant water without any modification added thereto. Accordingly, it is not necessary to provide a processing equipment for, for example, removing minerals and a filter for removing separated impurities, thereby preventing the configurations of the compressor 4 and the refrigerating machine 41 from being complicated.

Effects obtained by the second embodiment except for the above are the same as effects obtained by the first embodiment.

The above described embodiments should be considered as being illustrative and not restrictive in all aspects. The scope of the invention is defined by the claims rather than by the description of the embodiments as described above, and includes all changes within the metes and bounds equivalent to claims.

Figure 4:
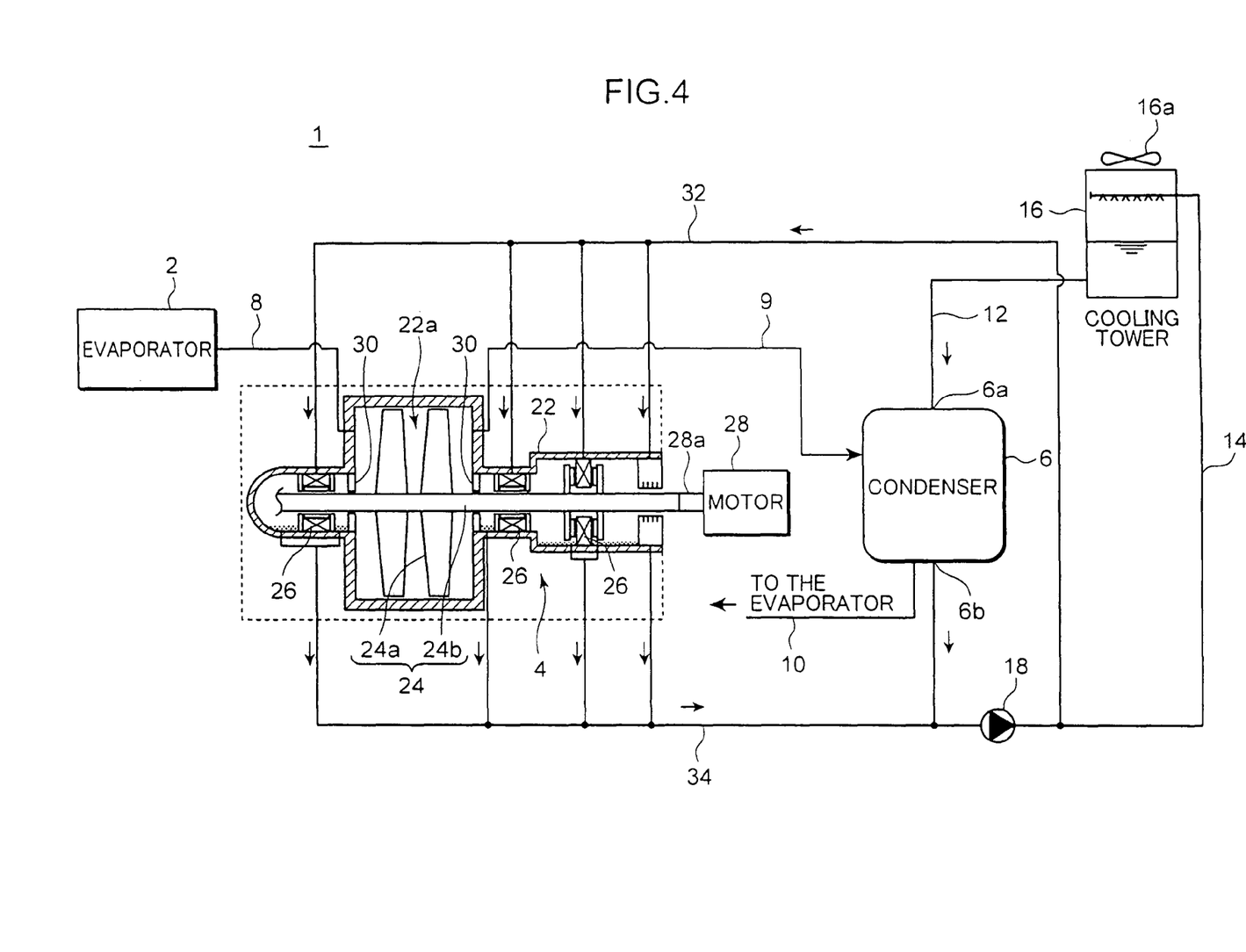
FIG. 4 schematically shows configurations of a compressor and a refrigerating machine according to a first modified example of the first embodiment of the present invention.

For example, as a first modified example in the first embodiment shown in FIG. 4, the lubricant supplying line 32 may connect the respective bearings 26 with the coolant returning line 14.

Specifically, in the first modified example, the lubricant supplying line 32 is connected to the coolant returning line 14 at a downstream of a position where the coolant pump 18 is disposed. In the first modified example, the drive of the coolant pump 18 causes the coolant water discharged from the condenser 6 to be conveyed through the coolant returning line 14 to the coolant tower 16 and to the coolant supplying line 12, while a part of the coolant water is conveyed to the respective bearings 26 from the coolant returning line 14 through the lubricant supplying line 32.

In the first modified example, a part of the coolant water discharged from the condenser 6 may also be used as the lubricant, and supplied to the respective bearings 26. Therefore, a water-storage equipment for the lubricant is unnecessary, thereby preventing the configurations of the compressor 4 and the refrigerating machine 1 from being complicated, similarly as the above-mentioned first embodiment.

Other effects than the above obtained by the first modified example are same as effects obtained by the first embodiment.

Figure 5:
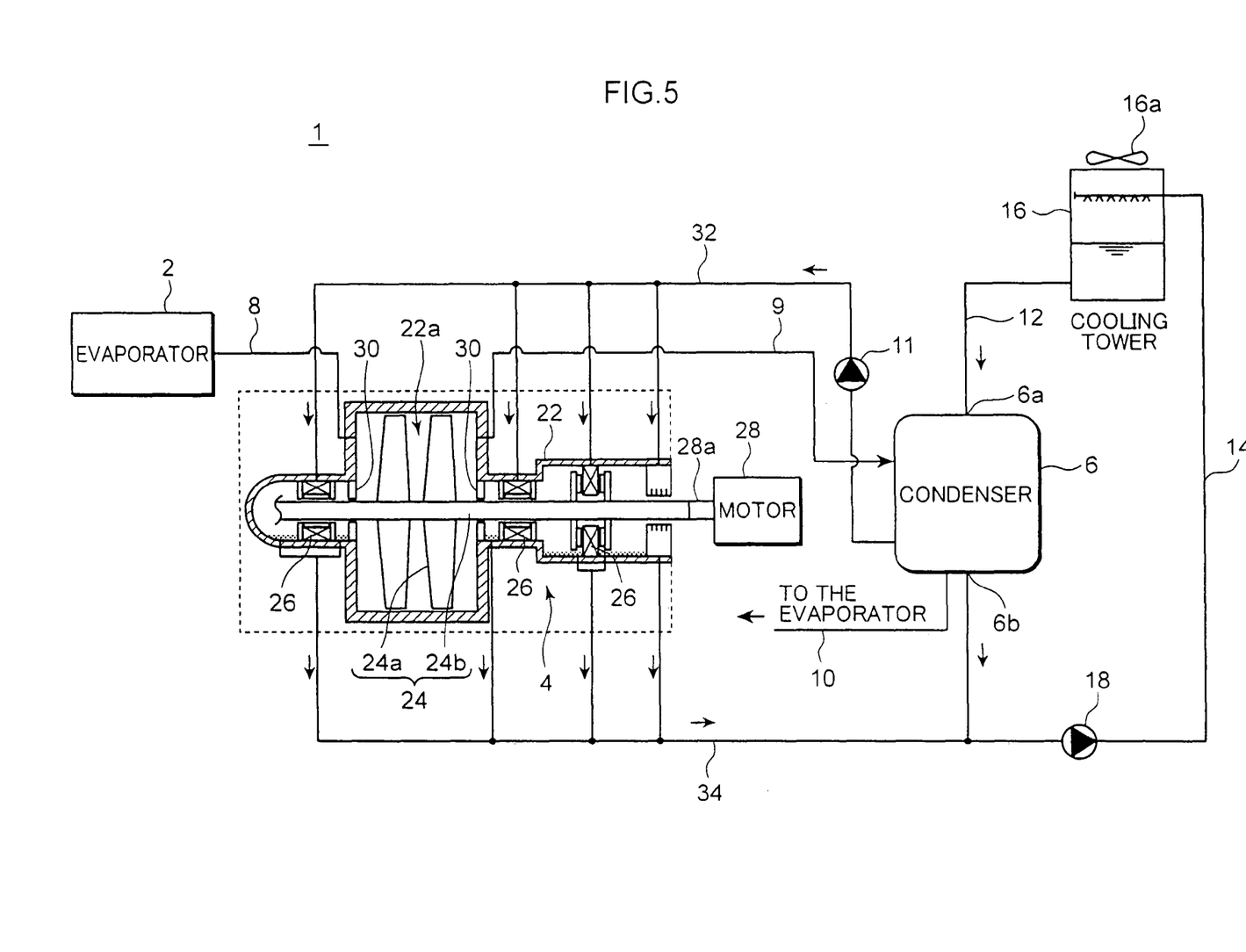
FIG. 5 schematically shows configurations of a compressor and a refrigerating machine according to a second modified example of the first embodiment of the present invention.

As a second modified example in the first embodiment, which is shown in FIG. 5, the lubricant supplying line 32 may directly connect the condenser 6 with the respective bearings 26.

Specifically, in the second modified example, the lubricant supplying line 32 is connected to a portion of the condenser 6 where the coolant water and the condensed water are retained. In the lubricant supplying line 32, the lubricant supplying pump 11 is disposed. The drive of the lubricant supplying pump 11 causes a part of water in the condenser 6 to be supplied through the lubricant supplying line 32 to the respective bearings 26.

In the second modified example, a part of water in the condenser 6 can also be used as the lubricant to be supplied to the respective bearings 26. Therefore, a water-storage equipment for the lubricant is unnecessary, thereby preventing the configurations of the compressor 4 and the refrigerating machine 1 from being complicated, similarly as the above-mentioned first embodiment.

Other effects than the above obtained by the second modified example are similar as effects obtained by the first embodiment.

Further, in the first embodiment, the first modified example and the second modified example, the condenser 6 may be an indirect heat exchange type condenser. In the second modified example, in a case when the condenser 6 performs the indirect heat exchange, it is preferable that the lubricant supplying line 32 is connected to the portion of the condenser 6, where the condensed water flows, so as to supply a part of the condensed water to the respective bearings 26 through the lubricant supplying line 32. In this case, it is possible to use the condensed water having the high degree of purity as the lubricant without any change. Accordingly, it is not necessary to provide a processing equipment for, for example, removing mineral in the lubricant water, and a filter for removing the separated impurities, thereby preventing the configurations of the compressor 4 and the refrigerating machine 1 from being complicated.

Further, in the above second embodiment, the condenser 46 may be a direct heat exchange type condenser.

As the cooling tower 16, a sealed-type cooling tower may be used in which coolant water is cooled inside thereof without making coolant water contact to external air. This arrangement prevents foreign material from getting into coolant water in the cooling tower 16 from exterior.

Further, the present invention may be applied to a compressor using a screw rotor, and a compressor including other configuration in a similar manner as above.

Further, the lubricant water to be supplied to the respective bearings 26 of the compressor 4 may be supplied from a supplying equipment provided separately from the coolant cycle of the coolant water including the condenser 6 and a condensed water supplying system of the condensed water flowing toward the evaporator 2.

Further, as the sealing member 30, a contact-type sealing member may be used which has an inner surface contacting to the outer surface of the rotating shaft 24b. Alternatively, the seal member 30 may be omitted.

The refrigerating machines 1 and 41 may be used in various kinds of cooling devices other than an air conditioner.

Summary of Embodiments

The above-described embodiments are summarized below.

The compressor according to the embodiments is a compressor which is used in a refrigerating machine including an evaporator and a condenser and adapted for compressing refrigerant gas evaporated in the evaporator to convey the compressed refrigerant gas to the condenser, includes: a motor; a housing having a compression chamber inside; a rotary member which has a rotating shaft and is rotated by a driving force of the motor so as to compress water vapor serving as the refrigerant gas in the compression chamber; a bearing for supporting the rotating shaft of the rotary member in the housing; and a lubricant supplier for supplying water serving as a lubricant to the bearing.

In the compressor, the water vapor serving as the refrigerant gas evaporated in the evaporator is compressed to be conveyed to the condenser, therefore the refrigerating machine to which the compressor is applied can employ water as a refrigerant. Since water is originally exists in the nature, water affects on the natural environment on its disposal much less than the refrigerant including a chemical material, such as a chlorofluorocarbon, does. Further, water is supplied as the lubricant to the bearing by the lubricant supplier in the compressor. With this arrangement, even if water serving as the lubricant supplied to the bearing is mixed with water serving as the refrigerant in the compression chamber of the housing, it is not necessary to separate water serving as the lubricant from the refrigerant gas after discharged from the compressor, since both are water. Therefore, unlike a conventional technique in which the refrigerant gas and the lubricating oil discharged together from the compressor are necessary to be separated from each other by an oil separator, no separator is necessary to be provided for separating the refrigerant gas from the lubricant, thereby allowing a configuration of the compressor to be simplified. In addition, in the inventive compressor, water is supplied to the bearing as the lubricant, thereby the water serving as the lubricant may be disposed as is, without troublesome treatment at the time of disposal. Accordingly, this arrangement enables to obtain the compressor which enables the easy disposal of the lubricant, and is friendly to the natural environment, with a simple configuration.

In the compressor, it is preferable that the refrigerating machine is provided with a coolant supplying line for supplying coolant water to the condenser; the lubricant supplier includes a lubricant supplying line connecting the bearing with the coolant supplying line.

With this arrangement, a part of the coolant water supplied to the condenser can also be used as the lubricant to be supplied to the bearing. Accordingly, unlike a configuration in which water to be used for the lubricant is supplied to the bearing from a water-storage equipment, such as a tank, no water-storage equipment is necessary to be provided, thereby preventing the configuration of the compressor from being complicated. In addition, the rotation of the rotary member generates a heat in the bearing, causing the temperature of the bearing to be raised. However, with this arrangement, a part of the low-temperature coolant water to be supplied to the condenser is also supplied to the bearing, thereby cooling the bearing. In other words, with this arrangement, a part of the low-temperature coolant water can also be used to cool the bearing. This eliminates a necessity of cooling of the lubricant to be supplied to the bearing for cooling the bearing, by a cooler and the like separately provided. Consequently, the bearing can be cooled without complicating the configuration of the compressor.

The refrigerating machine according to the embodiments includes the compressor having the lubricant supplying line connecting the bearing with the coolant supplying line; an evaporator; a condenser; a coolant supplying line for supplying coolant water to the condenser; a coolant returning line for returning coolant water discharged from the condenser to the coolant supplying line; and a cooling tower disposed between the coolant returning line and the coolant supplying line, for cooling the coolant water.

With this arrangement, the refrigerating machine includes the aforementioned compressor. Therefore, water can be used as both the refrigerant and the lubricant, and the configuration of the compressor can be simplified. Accordingly, with this arrangement, the refrigerating machine with a simple configuration can be obtained which enables easy disposal of the lubricant, and is friendly to the natural environment.

Here, it is preferable that the refrigerating machine further includes a coolant pump disposed in the coolant returning line, for conveying the coolant water discharged from the condenser to the coolant supplying line.

With this arrangement, a part of the coolant water can be conveyed to the bearing from the coolant supplying line through the lubricant supplying line by using a discharge pressure of the coolant pump. Accordingly, the lubricant can be smoothly supplied to the bearing without separately providing in the lubricant supplying line a pump for conveying water as the lubricant to the bearing. Consequently, this arrangement allows water serving as the lubricant to be smoothly conveyed to the bearing without complicating the configuration of the refrigerant machine.

In the above compressor, it is preferable that the refrigerating machine is provided with a condensed water supplying line for conveying a condensed water from the condenser to the evaporator; and the lubricant supplier includes a lubricant supplying line connecting the bearing with the condensed water supplying line, and a lubricant supplying pump disposed in the lubricant supplying line, for conveying a part of the condensed water to the bearing.

With this arrangement, a part of the condensed water conveyed from the condenser to the evaporator can also used as the lubricant to be supplied to the bearing. Therefore, a water-storage equipment for the lubricant is not necessary to be arranged, similarly as the above, thereby preventing the configuration of the compressor from being complicated. Further, the condensed water has a high degree of purity. Thus, impurities are hard to be separated out even if the condensed water is used as the lubricant without modification. Accordingly, it is not necessary to provide a processing equipment for, for example, removing mineral or a filter for removing the separated impurities. This also prevents the configuration of the compressor from being complicated.

The refrigerating machine according to the embodiments includes the compressor having the lubricant supplying line connecting the bearing with the condensed water supplying line; an evaporator; a condenser; and a condensed water supplying line for conveying a condensed water from the condenser to the evaporator.

With this arrangement, caused by being provided with the compressor, the refrigerating machine with a simple configuration can be obtained which is capable of the easy disposal of the lubricant, and is friendly to the natural environment, similarly as the above configuration.

In the above compressor, it is preferable that the refrigerating machine is provided with a coolant supplying line for supplying coolant water to the condenser and a coolant returning line for returning coolant water discharged from the condenser to the coolant supplying line; and the lubricant supplier includes a lubricant supplying line connecting the bearing with the coolant returning line.

With this arrangement, a part of coolant water discharged from the condenser can also be used as the lubricant to be supplied to the bearing. Therefore, it is not necessary to provide a water-storage equipment for the lubricant, thereby preventing the configuration of the compressor from being complicated, similarly as above.

Further, the refrigerating machine according to the embodiments includes the compressor having the lubricant supplying line connecting the bearing with the coolant returning line; an evaporator; a condenser; a coolant supplying line for supplying coolant water to the condenser; a coolant returning line for returning coolant water discharged from the condenser to the coolant supplying line; and a cooling tower disposed between the coolant returning line and the coolant supplying line, for cooling the coolant water.

With this arrangement, caused by being provided with the compressor, the refrigerating machine with a simple configuration can be obtained which is capable of the easy disposal of the lubricant, and is friendly to the natural environment, similarly as the above configuration.

Here, it is preferable that the refrigerant machine further includes a coolant pump disposed in the coolant returning line, for conveying the coolant water discharged from the condenser to the coolant supplying line.

With this arrangement, by a drive of the coolant pump, the coolant water discharged from the condenser can be returned to the coolant supplying line through the coolant returning line, and a part of the coolant water can also be conveyed to the bearing from the coolant returning line through the lubricant supplying line. Accordingly, the lubricant can be smoothly supplied to the bearing without providing a pump for conveying water serving as the lubricant to the bearing in the lubricant supplying line. Therefore, water serving as the lubricant can be smoothly supplied to the bearing without complicating the configuration of the refrigerant machine.

In the compressor, it is preferable that the lubricant supplier includes a lubricant supplying line connecting the condenser with the bearing, for supplying a part of water in the condenser to the bearing; and a lubricant supplying pump disposed in the lubricant supplying line, for conveying a part of water in the condenser to the bearing.

With this arrangement, a part of water in the condenser can also be used as the lubricant to be supplied to the bearing. Accordingly, it is not necessary to provide a water-storage equipment for the lubricant, thereby preventing the configuration of the compressor from being complicated, similarly as the above.

Further, the refrigerating machine of the embodiments includes the compressor having the lubricant supplying line connecting the condenser with the bearing; an evaporator; and a condenser.

With this arrangement, caused by being provided with the compressor, the refrigerating machine with a simple configuration can be obtained which is capable of the easy disposal of the lubricant; is friendly to the natural environment, similarly as the above configuration.

As mentioned above, according to the embodiments, a compressor and a refrigerating machine can be obtained which enable the easy disposal of the lubricant, are friendly to the natural environment, and have simple configurations.

The invention claimed is:

1. A compressor which is used in a refrigerating machine including an evaporator, a condenser and a coolant supplying line for supplying coolant water to the condenser, and adapted for compressing refrigerant gas evaporated in the evaporator to convey the compressed refrigerant gas to the condenser, comprising:
   a motor;
   a housing having a compression chamber inside;
   a rotary member which has a rotating shaft and is rotated by a driving force of the motor so as to compress water vapor serving as the refrigerant gas in the compression chamber;
   a bearing for supporting the rotating shaft of the rotary member in the housing; and
   a lubricant supplier for supplying water serving as a lubricant to the bearing, wherein
   the lubricant supplier includes a lubricant supplying line connecting the bearing with the coolant supplying line.

2. A refrigerating machine comprising a compressor which is used in a refrigerating machine including an evaporator and a condenser and adapted for compressing refrigerant gas evaporated in the evaporator to convey the compressed refrigerant gas to the condenser, comprising
   a motor,
   a housing having a compression chamber inside,
   a rotary member which has a rotating shaft and is rotated by a driving force of the motor so as to compress water vapor serving as the refrigerant gas in the compression chamber,
   a bearing for supporting the rotating shaft of the rotary member in the housing, and
   a lubricant supplier for supplying water serving as a lubricant to the bearing,
   wherein the refrigerating machine is provided with a coolant supplying line for supplying coolant water to the condenser; and
   the lubricant supplier includes a lubricant supplying line connecting the bearing with the coolant supplying line, the refrigeration machine comprising
   an evaporator;
   a condenser;
   a coolant supplying line for supplying coolant water to the condenser;
   a coolant returning line for returning coolant water discharged from the condenser to the coolant supplying line; and
   a cooling tower disposed between the coolant returning line and the coolant supplying line, for cooling the coolant water.

3. The refrigerating machine according to claim 2, further comprising a coolant pump disposed in the coolant returning line, for conveying the coolant water discharged froth the condenser to the coolant supplying line.

4. A compressor which is used in a refrigerating machine including an evaporator, a condenser and a condensed water supplying line for conveying a condensed water from the condenser to the evaporator, and adapted for compressing refrigerant gas evaporated in the evaporator to convey the compressed refrigerant gas to the condenser, comprising:
   a motor;
   a housing having a compression chamber inside;
   a rotary member which has a rotating shaft and is rotated by a driving force of the motor so as to compress water vapor serving as the refrigerant gas in the compression chamber;
   a bearing for supporting the rotating shaft of the rotary member in the housing; and
   a lubricant supplier for supplying water serving as a lubricant to the bearing, wherein
   the lubricant supplier includes a lubricant supplying line connecting the bearing with the condensed water supplying line, and a lubricant supplying pump disposed in the lubricant supplying line, for conveying a part of the condensed water to the bearing.

5. A refrigerating machine comprising:
   a compressor which is used in a refrigerating machine including an evaporator and a condenser and adapted for compressing refrigerant gas evaporated in the evaporator to convey the compressed refrigerant gas to the condenser, comprising
   a motor,
   a housing having a compression chamber inside,
   a rotary member which has a rotating shaft and is rotated by a driving force of the motor so as to compress water vapor serving as the refrigerant gas in the compression chamber,
   a bearing for supporting the rotating shaft of the rotary member in the housing, and
   a lubricant supplier for supplying water serving as a lubricant to the bearing, wherein the refrigerating machine is provided with a condensed water supplying line for conveying a condensed water from the condenser to the evaporator;
the lubricant supplier includes a lubricant supplying line connecting the bearing with the condensed water supplying line, and a lubricant supplying pump disposed in the lubricant supplying line, for conveying a part of the condensed water to the bearing;
an evaporator;
a condenser; and
a condensed water supplying line for conveying a condensed water from the condenser to the evaporator.

6. A compressor which is used in a refrigerating machine including an evaporator, a condenser and a coolant supplying line for supplying coolant water to the condenser and a coolant returning line for returning coolant water discharged from the condenser to the coolant supplying line, and adapted for compressing refrigerant gas evaporated in the evaporator to convey the compressed refrigerant gas to the condenser, comprising:
a motor;
a housing having a compression chamber inside;
a rotary member which has a rotating shaft and is rotated by a driving force of the motor so as to compress water vapor serving as the refrigerant gas in the compression chamber;
a bearing for supporting the rotating shaft of the rotary member in the housing; and
a lubricant supplier for supplying water serving as a lubricant to the bearing, wherein
the lubricant supplier includes a lubricant supplying line connecting the bearing with the coolant returning line.

7. A refrigerating machine comprising:
a compressor which is used in a refrigerating machine including an evaporator and a condenser and adapted for compressing refrigerant gas evaporated in the evaporator to convey the compressed refrigerant gas to the condenser, comprising
a motor,
a housing having a compression chamber inside,
a rotary member which has a rotating shaft and is rotated by a driving force of the motor so as to compress water vapor serving as the refrigerant gas in the compression chamber,
a bearing for supporting the rotating shaft of the rotary member in the housing, and
a lubricant supplier for supplying water serving as a lubricant to the bearing,
wherein the refrigerating machine is provided with a coolant supplying line for supplying coolant water to the condenser and a coolant returning line for returning coolant water discharged from the condenser to the coolant supplying line,
the lubricant supplier includes a lubricant supplying line connecting the bearing with the coolant returning line;
an evaporator;
a condenser;
a coolant supplying line for supplying coolant water to the condenser;
a coolant returning line for returning coolant water discharged from the condenser to the coolant supplying line; and
a cooling tower disposed between the coolant returning line and the coolant supplying line, for cooling the coolant water.

8. The refrigerating machine according to claim 7, further comprising a coolant pump disposed in the coolant returning line, for conveying the coolant water discharged from the condenser to the coolant supplying line.

9. A compressor which is used in a refrigerating machine including an evaporator and a condenser and adapted for compressing refrigerant gas evaporated in the evaporator to convey the compressed refrigerant gas to the condenser, comprising:
a motor;
a housing having a compression chamber inside;
a rotary member which has a rotating shaft and is rotated by a driving force of the motor so as to compress water vapor serving as the refrigerant gas in the compression chamber;
a bearing for supporting the rotating shaft of the rotary member in the housing; and
a lubricant supplier for supplying water serving as a lubricant to the bearing,
wherein the lubricant supplier includes:
a lubricant supplying line connecting the condenser with the bearing, for supplying a part of water in the condenser to the bearing; and
a lubricant supplying pump disposed in the lubricant supplying line, for conveying a part of water in the condenser to the bearing.

10. A refrigerating machine comprising:
a compressor which is used in a refrigerating machine including an evaporator and a condenser and adapted for compressing refrigerant gas evaporated in the evaporator to convey the compressed refrigerant gas to the condenser, comprising,
a motor,
a housing having a compression chamber inside,
a rotary member which has a rotating shaft and is rotated by a driving force of the motor so as to compress water vapor serving as the refrigerant gas in the compression chamber,
a bearing for supporting the rotating shaft of the rotary member in the housing, and
a lubricant supplier for supplying water serving as a lubricant to the bearing,
wherein the lubricant supplier includes:
a lubricant supplying line connecting the condenser with the bearing, for supplying a part of water in the condenser to the bearing, and
a lubricant supplying pump disposed in the lubricant supplying line, for conveying a part of water in the condenser to the bearing;
an evaporator; and
a condenser.

* * * * *

UNITED STATES PATENT AND TRADEMARK OFFICE
CERTIFICATE OF CORRECTION

PATENT NO. : 8,621,882 B2
APPLICATION NO. : 12/737529
DATED : January 7, 2014
INVENTOR(S) : Iizuka et al.

It is certified that error appears in the above-identified patent and that said Letters Patent is hereby corrected as shown below:

On the Title Page

Column 1, under Item (73) Assignees:

Please delete
"Danish Technological Institute, Taastrup (DK); Johnson Controls Denmark APS, Hojbierg (DK)"

Please add
--The Tokyo Electric Power Company, Incorporated, Tokyo (JP); Chubu Electric Power Company, Incorporated, Aichi (JP); The Kansai Electric Power Co., Inc., Osaka (JP); Kabushiki Kaisha Kobe Seiko Sho, Hyogo (JP); Danish Technological Institute, Taastrup (DK); Johnson Controls Denmark APS, Hojbierg (DK)--

Signed and Sealed this
Thirteenth Day of May, 2014

Michelle K. Lee
*Deputy Director of the United States Patent and Trademark Office*